(12) United States Patent
Hayen et al.

(10) Patent No.: US 10,001,974 B1
(45) Date of Patent: Jun. 19, 2018

(54) TECHNICAL BUILDING BLOCK

(71) Applicant: STATE FARM MUTUAL AUTOMOBILE INSURANCE COMPANY, Bloomington, IL (US)

(72) Inventors: Jon H. Hayen, Bloomington, IL (US); Clint Tarpley, Normal, IL (US); Vivek M. Thatte, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 149 days.

(21) Appl. No.: 15/135,127

(22) Filed: Apr. 21, 2016

Related U.S. Application Data

(60) Provisional application No. 62/262,536, filed on Dec. 3, 2015.

(51) Int. Cl.
*G06F 9/44* (2018.01)

(52) U.S. Cl.
CPC ...................... *G06F 8/20* (2013.01)

(58) Field of Classification Search
None
See application file for complete search history.

(56) References Cited

U.S. PATENT DOCUMENTS

| 6,651,240 | B1 * | 11/2003 | Yamamoto | G06F 8/24 717/104 |
| 7,716,631 | B1 * | 5/2010 | Katzer | G06F 8/20 717/102 |
| 2003/0221184 | A1 * | 11/2003 | Gunjal | G06F 8/24 717/118 |
| 2006/0168557 | A1 * | 7/2006 | Agrawal | G06F 8/20 717/104 |
| 2006/0200792 | A1 * | 9/2006 | Hagstrom | G06F 8/20 717/101 |
| 2006/0271912 | A1 * | 11/2006 | Mickle | G06F 8/355 717/106 |

(Continued)

OTHER PUBLICATIONS

Amazon Web Services—Development and Test on Amazon Web Services Nov. 2012.*

(Continued)

*Primary Examiner* — Insun Kang
(74) *Attorney, Agent, or Firm* — Hovey Williams LLP

(57) ABSTRACT

A virtual technical building block software development tool and a software development interface that speed accurate and quality software design are provided. The tools develop enterprise software architecture designs, and utilize a library of symbols and a virtual template. The library of symbols includes service oriented architecture symbols and enterprise application integration symbols. The template includes multiple sections to be displayed on a computing device screen. Each section includes a blank space bounded by a frame, and all of the sections are vertically aligned with one another to guide design flow. The sections of the template include, from top to bottom vertically, (1) a technical capabilities section; (2) an interaction sequence section; (3) a service topology section; (4) an integration flow section; and (5) a logging section. The technical building block software development tool streamlines software development and significantly reduces implementation and design time, and ensures reproducible quality of design.

20 Claims, 3 Drawing Sheets

(56) References Cited

U.S. PATENT DOCUMENTS

| | | | |
|---|---|---|---|
| 2008/0256506 A1* | 10/2008 | Chaar | G06F 8/10 |
| | | | 717/101 |
| 2009/0293042 A1* | 11/2009 | Nakagawa | G06F 11/3664 |
| | | | 717/110 |
| 2011/0246961 A1* | 10/2011 | Tripathi | G06F 8/34 |
| | | | 717/105 |
| 2014/0075411 A1* | 3/2014 | Diep | G06F 8/34 |
| | | | 717/109 |
| 2015/0135163 A1* | 5/2015 | Mun | G06F 8/71 |
| | | | 717/120 |
| 2016/0170743 A1* | 6/2016 | Shmulevich | G06F 17/3056 |
| | | | 717/120 |
| 2016/0321064 A1* | 11/2016 | Sankaranarasimhan | |
| | | | G06F 3/0484 |
| 2017/0060562 A1* | 3/2017 | Lopez | G06F 8/60 |
| 2017/0083290 A1* | 3/2017 | Bharthulwar | G06F 8/20 |
| 2017/0083292 A1* | 3/2017 | McLaughlan | G06F 8/34 |
| 2017/0102925 A1* | 4/2017 | Ali | G06F 8/36 |
| 2017/0139685 A1* | 5/2017 | Fu | G06F 8/35 |
| 2017/0139695 A1* | 5/2017 | Govindaraju | G06F 8/60 |
| 2017/0168782 A1* | 6/2017 | Boyd | G06F 8/34 |
| 2017/0235550 A1* | 8/2017 | Fu | G06F 8/35 |
| | | | 717/104 |

OTHER PUBLICATIONS

Microsoft, Section 1: Introducing the Architect, 2003.*
Arsanjani et al., Design an SOA solution using a reference architecture, Aug. 2014.*

* cited by examiner

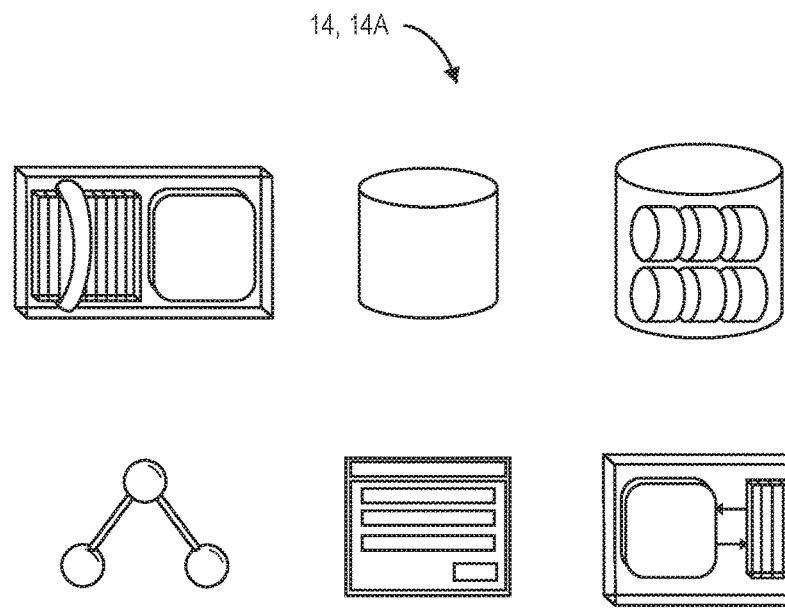

US 10,001,974 B1

TECHNICAL BUILDING BLOCK

RELATED APPLICATION

The current patent application is a non-provisional patent application which claims priority benefit with regard to all common subject matter to U.S. Provisional Application Ser. No. 62/262,536, titled "TECHNICAL BUILDING BLOCK", filed Dec. 3, 2015. The earlier-filed provisional application is hereby incorporated by reference in its entirety into the current patent application.

FIELD OF THE INVENTION

The present disclosure generally relates to technical building block software and/or computer software development interfaces for developing software programs and applications.

BACKGROUND

Software development teams are generally responsible for creating software in support of a new product or program. For example, a corporation might offer a new device for sale to the public. The corporation might also offer technical support of the device in the form of technical documents from a website, customer representatives providing phone support, software or firmware updates, and the like. Each of these aspects may require software created by a software development team to implement them.

Alternatively, a company, such as an insurance provider, may offer a program that provides a discount on insurance premiums to qualified customers. The insurance provider may alert customers to the existence of the program, verify the qualifications of customers, and periodically monitor customer feedback or telematics data to verify that the qualifications are maintained. These activities may also require software to be created by a software development team implement them.

Software development teams may typically encounter several problems when working on a software creation project. First, there is often a lack of computer software tools that allow a software architect or designer to create and document the architecture of the software which will provide product or program support. Second, as a result of the first problem, there is an inability of one development team to share the software architecture with another team that may have similar software requirements. These and other problems may lead to extended development times, inefficient usage of resources, and other drawbacks.

BRIEF SUMMARY

Embodiments of the present technology relate to technical building block software and/or computer interfaces for use when developing enterprise software architecture designs. The embodiments may provide for a software development interface that includes a library of symbols and a template. A software architect may utilize the symbols, at least in part, to enter a design into the template. The template specifies the design of the software at multiple levels and may be used by programmers to write code for the design. In addition, the design pattern may be reused in full, or in part, to create new design patterns.

In a first aspect, a software development template implemented on a computing device for use when developing enterprise software architecture designs may be provided. The template may include a plurality of sections to be displayed on a computing device screen wherein each section includes blank space bounded by a frame with all of the sections being vertically aligned with one another. The sections may include: (1) a technical capabilities section configured to receive a plurality of capability components, each capability component representing a function of a software architecture design, wherein at least a portion of the capability components are positioned in separate columns within the frame; (2) an interaction sequence section configured to receive a plurality of interaction components illustrating the interaction between the capability components, each interaction component being associated with the capability components in one column of the technical capabilities section, each interaction component further being vertically aligned with its associated capability components; (3) a service topology section configured to receive a plurality of service components that represent the hardware and software performing the functions of the capability components and the interaction components, each service component being associated with the capability components and interaction components in one column, each service component further being vertically aligned with its associated capability components and interaction components; (4) an integration flow section configured to receive a plurality of integration components which represent hardware and software implementing the flow of information between a service requestor and a service provider, each integration component being associated with the capability components, interaction components, and service components in one column, each integration component further being vertically aligned with its associated capability components, interaction components, and service components; and/or (5) a logging section configured to receive a plurality of logging components which represent hardware and software indicating the occurrence of events or activities related to the function of the software design, each logging component resulting from an action of one or more of the other components and being vertically aligned therewith. The software development template may include additional, fewer, or alternative sections, including those discussed elsewhere herein.

In another aspect, a software development interface implemented on a computing device for use when developing enterprise software architecture designs may be provided. The interface may comprise a library of symbols and a template. The library of symbols may include service oriented architecture symbols and enterprise application integration symbols. The template may include a plurality of sections to be displayed on a computing device screen wherein each section includes blank space bounded by a frame with all of the sections being vertically aligned with one another. The sections may include (1) a technical capabilities section configured to receive a plurality of capability components, each capability component representing a function of a software architecture design, wherein at least a portion of the capability components are positioned in separate columns within the frame; (2) an interaction sequence section configured to receive a plurality of interaction components illustrating the interaction between the capability components, each interaction component being associated with the capability components in one column of the technical capabilities section, each interaction component further being vertically aligned with its associated capability components; (3) a service topology section configured to receive a plurality of service components that represent the hardware and software performing the functions of the capability components and the interaction components, each service component being associated with the capability components and interaction components in one column, each service component further being vertically aligned with its associated capability components and interaction components; (4) an integration flow section configured to receive a plurality of integration components which represent hardware and software implementing the flow of information between a service requestor and a service provider, each integration component being associated with the capability components, interaction components, and service components in one column, each integration component further being vertically aligned with its associated capability components, interaction components, and service components; and/or (5) a logging section configured to receive a plurality of logging components which represent hardware and software indicating the occurrence of events or activities related to the function of the software design, each logging component resulting from an action of one or more of the other components and being vertically aligned therewith. The software development interface may include additional, fewer, or alternative features, including those discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of computer interfaces disclosed therein. It should be understood that each Figure depicts an embodiment of a particular aspect of the disclosed interfaces, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

FIG. 2 illustrates a portion of a first library of symbols including service oriented architecture symbols;

FIG. 3 illustrates a portion of a second library of symbols including enterprise application integration symbols.

Figure 1:
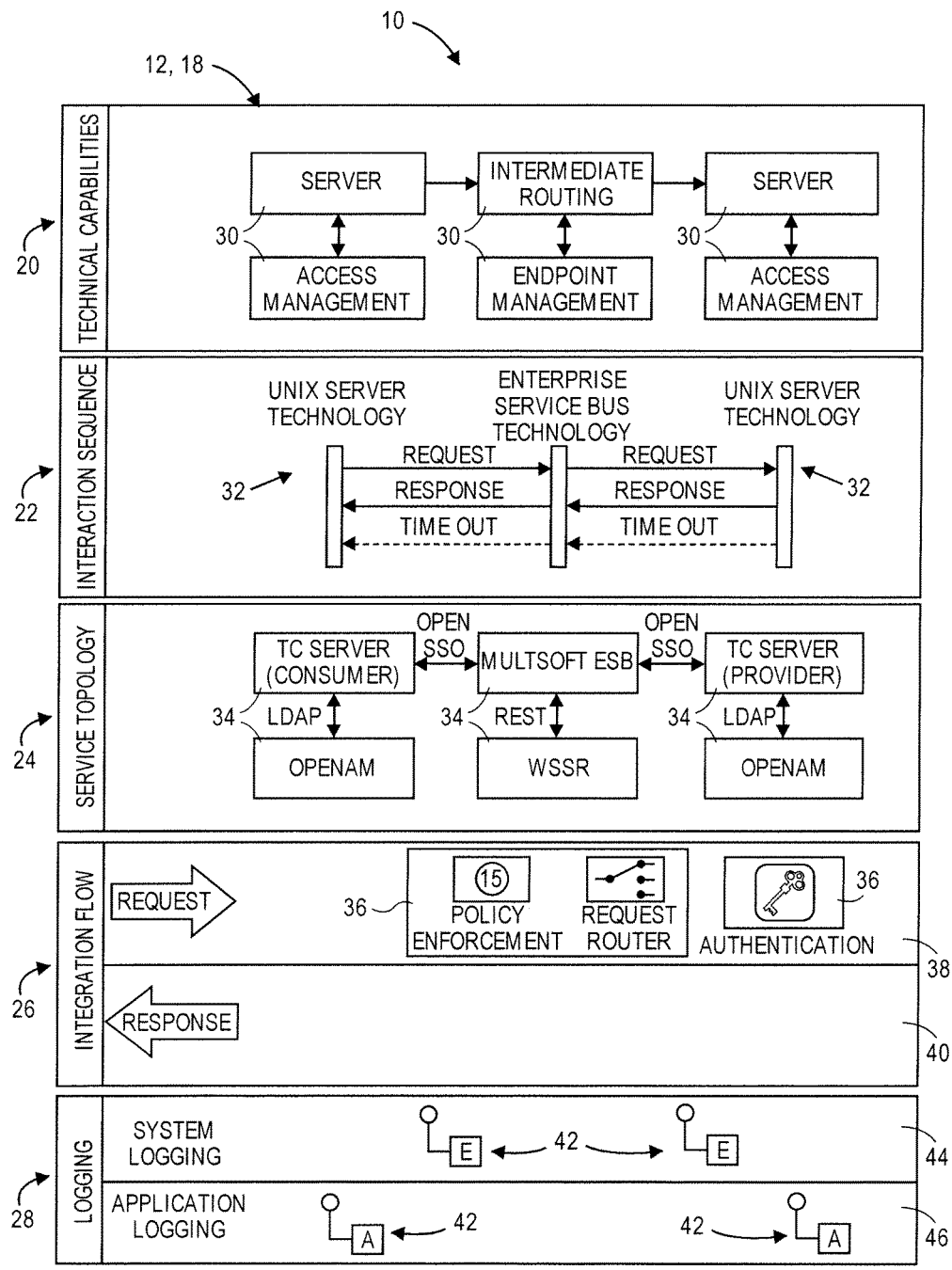
FIG. 1 illustrates an exemplary virtual technical building block and/or software development interface, constructed in accordance with various embodiments, comprising a template and symbols from a library of symbols.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments described in this patent application and other possible embodiments address a computer-centric challenge or problem with a solution that is necessarily rooted in computer technology and may relate to, inter alia, virtual technical building blocks and/or computer interfaces for use when developing enterprise software architecture designs. An interface allows for schematic entry of enterprise software architecture designs. A software architect or developer may utilize the interface to design a software package or application and specify the components of the design at multiple levels. In one embodiment, the design itself may not include any programming code, but may be handed off to a programming team who can create the actual computer code based on the specifications of the design.

The interface may include a template and a library of symbols. The template may comprise a plurality of sections, each including a frame into which components of the design are entered. The sections of the template may include five sections guiding the flow of software development or design: (1) a technical capabilities section, (2) an interaction sequence section, (3) a service topology section, (4) an integration flow section, and/or (5) a logging section.

First, the technical capabilities section may include a diagram of capability components representing major architectural functions or features of the design. Second, the interaction sequence section may include a diagram of interaction components illustrating the interaction between the capability components of the technical capabilities section. Third, the service topology section may include a diagram of service components that represent the hardware and software performing the functions, capabilities, and interactions indicated in the technical capabilities section and the interaction sequence section. Fourth, the integration flow section may include a diagram of integration components which represent hardware and software implementing the flow of information between a service requestor and a service provider. Fifth, the logging section may include a plurality of logging components indicating the occurrence of events or activities related to the function of the software design. The symbols may include service oriented architecture (SOA) symbols and enterprise application integration (EAI) symbols.

Specific embodiments of the technology will now be described in connection with the attached drawing figures. The embodiments are intended to describe aspects of the invention in sufficient detail to enable those skilled in the art to practice the invention. Other embodiments may be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Exemplary Software Development Interface

Figure 4:
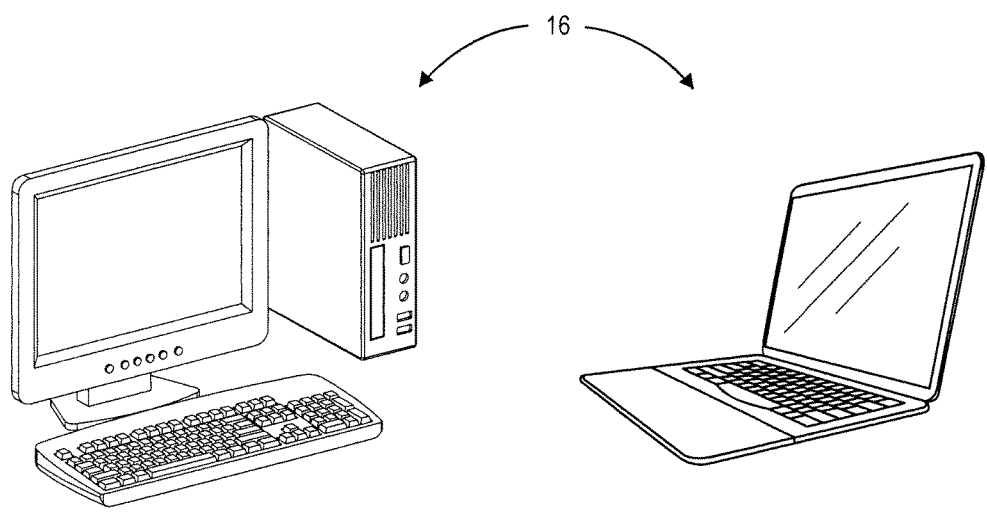
FIG. 4 illustrates exemplary computing devices on which the software development interface may be implemented.

FIGS. 1-3 depict an exemplary software development interface 10 for use when developing enterprise software architecture designs. The software development interface 10 may broadly comprise a template 12, as shown in FIG. 1, and a library of symbols 14, as shown in FIGS. 2 and 3. The software development interface 10 may be implemented in a computer-aided design (CAD) program, such as Visio® from Microsoft® Corporation of Redmond, Wash., that is executed on a computing device 16, such as the devices shown in FIG. 4 including a desktop computer, a laptop computer, a workstation computer, a tablet, or the like. In various embodiments, the template 12 may be automatically loaded into the CAD program when the CAD program is started. Alternatively, the template 12 may be loaded as a file or design. Once the template 12 is loaded, all of it, or part of it, may appear on the screen of the computing device 16 display. The library of symbols 14 may be accessible through the CAD program. Using the template 12 and the library of symbols 14, a software design may be entered as described below.

The template 12 may include at least five sections 18 or fields into which the appropriate design schematics or descriptions are placed. Each section 18 may include a frame that bounds blank space, represented on the computing device 16 display by an empty rectangle. In some embodiments, each section 18 may have a different background color. In addition, each section 18 may include a section title bar, which includes the name of the section and is positioned on one side of the frame, or alternatively along the top of the frame. The five sections 18 include a technical capabilities section 20, an interaction sequence section 22, a service topology section 24, an integration flow section 26, and a logging section 28. In order to illustrate the features and function of each section 18, an exemplary design for communicating data between computer servers has been implemented in the template 12 shown in FIG. 1.

The technical capabilities section 20 may include a diagram of capability components 30 representing major architectural functions or features of the design. In typical embodiments, each capability component 30 is presented in generic terms in a separate block with lines of data flow or control flow positioned therebetween, as appropriate. The capability components 30 may broadly include data sources, data destinations, data transceivers, and the like, such as computer servers acting as a provider or a consumer that either store data or perform a function on data, network switches, routers, or hubs, electronic devices in the possession of customers such as desktop or laptop computers, mobile electronic devices (like smartphones), sensors or the like generating telematics data, and so forth.

Each capability component 30 that performs a particular function, such as providing data or consuming data, may be positioned in its own column across the width of the frame of the technical capabilities section 20. Data or control function capability components 30 may be positioned in the same column as the data provider or consumer capability components 30 to which the function relates. Alternatively, the data or control function capability components 30 may be positioned in their own column along a path between two data source or destination capability components 30. In addition, lines connecting the capability components 30 together may be added, with each line including an arrowhead at one or both ends indicating the direction of flow of data or information between the capability components 30.

In the exemplary design shown in FIG. 1, data may be routed between two servers. Thus, the technical capabilities section 20 includes first and second capability components 30 labeled "server", each positioned in its own column. A third capability component 30, labeled "intermediate routing", is positioned in a column therebetween. Fourth and fifth capability components 30, each labeled "access management" and associated with one of the servers, are each positioned in the column of the associated server. A sixth capability component 30, labeled "endpoint management", is positioned in the column with the access management.

The interaction sequence section 22 may include a diagram of interaction components 32 illustrating the interaction between the capability components 30 of the technical capabilities section 20. Each interaction component 32 may include at least one vertical bar, or vertically-oriented rectangle, and a label describing the interaction. Each interaction component 32 may be associated with one column of capability components 30 from the technical capabilities section 20. Furthermore, each interaction component 32 may be vertically aligned with its associated column of capability components 30.

The interaction component 32 typically provides the specifics of the capability components 30 with which it is associated. For example, if one of the capability components 30 of a column in the technical capabilities section 20 named a "server", then the interaction component 32 in the interaction sequence section 22 may identify the specific technology of the server, such as "UNIX". As another example, one of the capability components 30 names "intermediate routing". The associated interaction component 32 identifies the routing as "enterprise service bus technology". The interaction sequence section 22 may further include indications, such as lines with arrowheads, of interactions between the interaction components 32, which represent the sequence of request/response flows of the software design. Exemplary interactions may include requests of data or actions from a first capability to a second capability, responses from the second capability to the first capability, time outs for the requests or other actions, and the like. The layout of the interaction components 32 and the sequence indications may follow software markup standards.

The service topology section 24 may include a diagram of service components 34 that represent the hardware and software performing the functions, capabilities, and interactions indicated in the technical capabilities section 20 and the interaction sequence section 22. The service components 34 may be presented in blocks, as shown in FIG. 1. Alternatively, or additionally, the service components 34 may be selected from the library of service oriented architecture (SOA) symbols 14A, as shown in FIG. 2, and entered into the service topology section 24. The service components 34 may be placed in alignment with the related capabilities indicated by the capability components 30 and interaction components 32.

The service components 34 may include specific service implementations, or implemented products, of the capabilities from the sections 18 above. For example, a server may be indicated in the technical capabilities section 20 and UNIX server technology may be associated in the interaction sequence section 22. In the service topology section 24, the server may be specified as a Web application server, such as an enterprise version of Apache Tomcat™. As an additional example, the enterprise service bus indicated in the interaction sequence section 22 may be specified as Mule enterprise service bus from Mulesoft in San Francisco, Calif. In addition, the service topology section 24 may include secondary service components 34 that are positioned in the same column as the primary service components 34 with which they interact. For example, the web server application mentioned above may interact with an access management component, such as OpenAM from Forgerock of San Francisco, Calif.

Furthermore, the service topology section 24 may include indicators, such as lines with arrowheads, that illustrate the communication protocols between the service components 34. Examples of protocols may include lightweight directory access protocol (LDAP), representational state transfer (ReST), open single sign-on (OpenSSO), and the like.

The integration flow section 26 may include a diagram of integration components 36 which represent hardware and software implementing the flow of information between a service requestor and a service provider. Typically, software applications or portions of software applications communicate with each other in order to make requests or responses and perform routine operations or event sequences by sending messages to one another. The integration flow section 26 may be partitioned into a request subsection 38, which includes integration components 36 that request service, data, or access, and a response subsection 40, which includes integration components 36 that respond to requests.

The integration components 36 may be selected from the library of Enterprise Application Integration (EAI) symbols 14A, as shown in FIG. 3, and entered into the integration flow section 26. Furthermore, the integration components 36 may be positioned within the integration flow section 26 in vertical alignment with associated service components 34, interaction components 32, and capability components 30 of the other sections 18.

In the request subsection 38 of the integration flow section 26 of FIG. 1, the exemplary software design may include policy enforcement and request routing, as indicated by the EAT symbols. The policy enforcement may involve enforcing policies for security and access control when requests are received from servers wanting accessing to secure resources. For example, the policy enforcement may limit the number of service invocations that can be requested. The requests may be filtered and routed to specific locations for approval of access. Thus, the exemplary software design may also include authentication, which is aligned with the provider server from the service topology section 24. Authentication may verify the identity of the individual requesting access. Responses to the requests may be placed in the response subsection 40.

The logging section 28 may include a plurality of logging components 42 indicating the occurrence of events or activities related to the function of the software design. The logging components 42 may be useful for tracking transactions or for debugging either during the development stage or during implementation when errors occur. The logging section 28 may be partitioned into a system logging subsection 44, which logs system events such as receiving a request and passing the request on to the appropriate destination, and an application logging subsection 46, which logs messages at the application level. The logging components 42 may result from certain actions by the integration components 36, the service components 34, the interaction components 32, the capability components 30, or combinations thereof. Thus, each logging component 42 may be positioned in vertical alignment with one or more of the components in the other sections 18.

The library of symbols 14 may include two sub libraries—a library of service oriented architecture (SOA) symbols 14A, a portion of which is shown in FIG. 2, and a library of enterprise application integration (EAI) symbols 14B, a portion of which is shown in FIG. 3. The SOA symbols 14A may include SOA drafting symbols or icons that are generally used in the service topology section 24. The symbols may include a service with a uniform contract, a storage device or repository, a message queue, a service composition, a user interface, a Web service with a service contract, among others. The EAI symbols 14B may include EAI drafting symbols that are generally used in the integration flow section 26. The symbols may include messaging patterns such as a messaging filter, a message store, a message translator, a messaging bridge, a messaging gateway, a message dispatcher, among others.

In various embodiments, the library of symbols 14 may be stored in, or accessed through, a database or library, wherein each symbol may be associated with data tags that allow the symbols to be searched and retrieved through the use of search terms. The library of symbols 14 may be visible, at least in part, on the same screen as the template 12 or may be viewed and accessed on a different screen from the template 12.

Exemplary Software Development Template for Use when Developing Enterprise Software Architecture Designs In a first aspect, a software development template implemented on a computing device for use when developing enterprise software architecture designs may be provided. The template may include a plurality of sections to be displayed on a computing device screen wherein each section includes blank space bounded by a frame with all of the sections being vertically aligned with one another.

A first section may be a technical capabilities section configured to receive a plurality of capability components, each capability component representing a function of a software architecture design, wherein at least a portion of the capability components are positioned in separate columns within the frame. A second section may be an interaction sequence section configured to receive a plurality of interaction components illustrating the interaction between the capability components, each interaction component being associated with the capability components in one column of the technical capabilities section, each interaction component further being vertically aligned with its associated capability components. A third section may be a service topology section configured to receive a plurality of service components that represent the hardware and software performing the functions of the capability components and the interaction components, each service component being associated with the capability components and interaction components in one column, each service component further being vertically aligned with its associated capability components and interaction components. A fourth section may be an integration flow section configured to receive a plurality of integration components which represent hardware and software implementing the flow of information between a service requestor and a service provider, each integration component being associated with the capability components, interaction components, and service components in one column, each integration component further being vertically aligned with its associated capability components, interaction components, and service components. A fifth section may be a logging section configured to receive a plurality of logging components which represent hardware and software indicating the occurrence of events or activities related to the function of the software design, each logging component resulting from an action of one or more of the other components and being vertically aligned therewith. The template may include additional, fewer, or alternative sections, including those discussed elsewhere herein.

Furthermore: the capability components representing similar functions may be positioned in the same column, and the technical capabilities section may further include a plurality of lines, with each line connecting at least two capability components to one another, and each line including at least one arrowhead indicating a direction of flow of data between the capability components. Each interaction component may include a vertically-oriented bar and a label positioned therewith describing the specific implementation of the function of the capability component associated with the interaction component. The interaction sequence section may further includes a plurality of lines between each pair of adjacently-positioned interaction components, with the lines indicating a request, a response, and a time out, as necessary. The service components may include service oriented architecture symbols. The integration flow section may include a request subsection in which integration components requesting service, data, or access are placed and a response subsection in which integration components responding to requests are placed. The integration components may include enterprise application integration symbols. The logging section may include a system logging subsection in which logging components log system events, and an application logging subsection in which logging components log messages at an application level.

Exemplary Software Development Interface for Use when Developing Enterprise Software Architecture Designs In another aspect, a virtual technical building block for software design and/or a software development interface implemented on a computing device for use when developing enterprise software architecture designs may be provided. The technical building block and/or interface may comprise a library of symbols and a template. The library of symbols may include service oriented architecture symbols and enterprise application integration symbols. The template may include a plurality of sections to be displayed on a computing device screen wherein each section includes blank space bounded by a frame with all of the sections being vertically aligned with one another. The sections may include (1) a technical capabilities section configured to receive a plurality of capability components, each capability component representing a function of a software architecture design, wherein at least a portion of the capability components are positioned in separate columns within the frame; (2) an interaction sequence section configured to receive a plurality of interaction components illustrating the interaction between the capability components, each interaction component being associated with the capability components in one column of the technical capabilities section, each interaction component further being vertically aligned with its associated capability components; (3) a service topology section configured to receive a plurality of service components that represent the hardware and software performing the functions of the capability components and the interaction components, each service component being associated with the capability components and interaction components in one column, each service component further being vertically aligned with its associated capability components and interaction components; (4) an integration flow section configured to receive a plurality of integration components which represent hardware and software implementing the flow of information between a service requestor and a service provider, each integration component being associated with the capability components, interaction components, and service components in one column, each integration component further being vertically aligned with its associated capability components, interaction components, and service components; and/or (5) a logging section configured to receive a plurality of logging components which represent hardware and software indicating the occurrence of events or activities related to the function of the software design, each logging component resulting from an action of one or more of the other components and being vertically aligned therewith. The interface may include additional, fewer, or alternative features, including those discussed elsewhere herein.

Furthermore, the capability components representing similar functions may be positioned in the same column; the technical capabilities section may further include a plurality of lines (with each line connecting at least two capability components to one another, and each line including at least one arrowhead indicating a direction of flow of data between the capability components); each interaction component may include a vertically-oriented bar and a label positioned therewith describing the specific implementation of the function of the capability component associated with the interaction component; the interaction sequence section may further include a plurality of lines between each pair of adjacently-positioned interaction components, the lines indicating a request, a response, and a time out, as necessary; the service components may include service oriented architecture symbols; the integration flow section may include a request subsection in which integration components requesting service, data, or access are placed and a response subsection in which integration components responding to requests are placed; the integration components may include enterprise application integration symbols; and/or the logging section may include a system logging subsection in which logging components log system events, and an application logging subsection in which logging components log messages at an application level.

Exemplary Technical Building Block

Prior to the creation of the Technical Building Block pattern template and pattern library, projects seeking design pattern information would have to seek out design pattern information which may be decentralized across many sources and fragmented by area of concern (i.e., System topology, component interaction sequence, integration methods, etc.) The Enterprise Architecture Technical Building Block pattern template and content library provides a complete, concise, and standardized format for documenting solution design patterns.

The Technical Building Block pattern template separates five primary areas of design concern into specific content layers utilizing specific nomenclature for each layer. The content layers are described below.

At a high level, the "Technical Building Block" tool may include two main functionality parts—"What?" and "How?" parts. The "What?" part may include 2 sections—the Technical Capabilities and Interaction Sequence sections.

The Technical Capabilities section may describe the key technical architectural capabilities included in the Technical Building Block, and may address the technical capabilities of the computing system and/or software, and the logical relationship between the capabilities. In addition to the icons shown in FIG. 1, other icons may be utilized for this section. For instance, the Technical Capabilities section may include icons related servers, framework services, storage, memory units, databases, scheduling, data quality management, access management, structured data, WAN or other connectivity, data movement, message queuing, data transformation, mobile, message processing, and/or other features, capabilities, or requirements (to virtually depict the Technical Capabilities).

The Interaction Sequence may describe the interaction sequence between the categorized capabilities included in the Technical Building Block, and may address a technology category, request flow, timeouts, retry, call-back, and/or error handling. In addition to the icons shown in FIG. 1, other icons may be utilized for this section. For instance, the Interaction Sequence may include descriptive labels or icons related to personal computers, Linux or other servers, EAI technology, and mainframes (to virtually depict the Interaction Sequence). For instance, communication sequence may be Personal Computing Technology→Linux Server Technology→Linux Server Technology→Linux Server Technology→Linux Server Technology→EAI Technology→Mainframe Technology, or the like.

The "How?" part of the Technical Building Block tool may include 3 sections—the Service Topology, Integration Flow, and Logging sections. The Service Topology section may describe the service topology of the software, and may address technology products, technical architecture techniques, and/or consumer/provider context. In addition to the icons shown in FIG. 1, other icons may be utilized for this section. For instance, sub-windows may be displayed virtually representing (1) a mobile customer, (2) a vendor environment, and (3) Enterprise environment—all in electronic communication with each other (to virtually depict the Service Topology). The mobile customer sub-window may include an iOS/Android icon. The vendor environment sub-window may include Tc Server, Rabbit MQ, Linux/Flume, Linux/HBase, and Linx/MapReduce icons. The Enterprise environment sub-window may include Linux WTX, Linux WAS/MQ, and Z/OS Haplex icons.

The Integration Flow section may describe the integration flow between the service requestor and service provider, and may address security, integration capabilities, request mediation, and/or response mediation. In addition to the icons shown in FIG. 1, other icons may be utilized for this section. For instance, authentication, message endpoint, semantic translation, aggregator, message gateway, message router, and format translation icons may be used to depict the Integration Flow. The Integration Flow may relate to the functionality that is to be developed.

The Logging section may indicate the points of recommended system and application event logging, and may address event logging, transaction visibility, and/or traceability. The Logging section may use icons other than those depicted in FIG. 1.

The Technical Building Block Pattern document may contain a detailed text description of each layer of the information contained within the Technical Building Block template. This document provides an opportunity to explain additional design considerations related to the solution pattern.

The Technical Building Block Diagram Template contains a graphical depiction of each layer of the Technical Building Block Pattern Library. The Technical Building Block Pattern Library may provide a searchable repository of design patterns. Design patterns may be tagged using meta-data that assists the consumer with easily locating the appropriate design pattern for their project.

The Technical Building Block pattern template provides a unique approach to document solution design patterns. The Technical Building Block is based upon an organizations' formally recognized Technical Capabilities—which provides direct lineage between documented technical architecture capabilities and the solution design concepts that are applied within a project lifecycle. The Technical Building Block pattern template consolidates design perspective on five primary areas of concern into a single, standardized, artifact which simplifies access and consumption. The alignment of content between each layer of the pattern template allows the Architect to navigate from high-level design concepts down to low-level design concepts within a single view.

In one aspect, a technical building block tool for software requirement design may be provided. The technical building block may include a user interface including (1) a technical capabilities section that provides a virtual representation of the technical architectural capabilities of a computing system, and a relationship between the technical architectural capabilities; (2) an interaction sequence section that provides a virtual representation of a sequence of communication between the technical architectural capabilities shown in the technical capabilities sections; (3) a service topology section that provides a virtual representation of a service topology of software; (4) an integration flow section that provides a virtual representation of integration flow between service requestor and service provider; and/or (5) a logging section that provides a virtual representation of points of recommended system and application event logging to facilitate establishing software design requirements given desired software functionality.

Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

We claim:

1. A software development template implemented on a computing device for use when developing enterprise software architecture designs, the software development template comprising:
   a plurality of sections to be displayed on a computing device screen, each section including blank space bounded by a frame with all of the sections being vertically aligned with one another, the sections including:
     a technical capabilities section configured to receive a plurality of capability components, each capability component representing a function of a software architecture design, wherein at least a portion of the capability components are positioned in separate columns within the frame;
     an interaction sequence section configured to receive a plurality of interaction components illustrating the interaction between the capability components, each interaction component being associated with the capability components in one column of the technical capabilities section, each interaction component further being vertically aligned with its associated capability components;
     a service topology section configured to receive a plurality of service components that represent hardware and software performing functions of the capability components and the interaction components, each service component being associated with the capability components and interaction components in one column, each service component further being vertically aligned with its associated capability components and interaction components;

an integration flow section configured to receive a plurality of integration components which represent hardware and software implementing a flow of information between a service requestor and a service provider, each integration component being associated with the capability components, interaction components, and service components in one column, each integration component further being vertically aligned with its associated capability components, interaction components, and service components; and a logging section configured to receive a plurality of logging components which represent hardware and software indicating the occurrence of events or activities related to the function of the software design, each logging component resulting from an action of one or more of the capability components, interaction components, service components, and integration components and being vertically aligned therewith.

2. The software development template of claim 1, wherein capability components representing similar functions are positioned in the same column.

3. The software development template of claim 1, wherein the technical capabilities section further includes a plurality of lines, each line connecting at least two capability components to one another, each line including at least one arrowhead indicating a direction of flow of data between the capability components.

4. The software development template of claim 1, wherein each interaction component includes a vertically-oriented bar and a label positioned therewith describing a specific implementation of the functions of the capability components associated with the interaction component.

5. The software development template of claim 1, wherein the interaction sequence section further includes a plurality of lines between each pair of adjacently-positioned interaction components, the lines indicating a request, a response, and a time out, as necessary.

6. The software development template of claim 1, wherein the service components include service oriented architecture symbols.

7. The software development template of claim 1, wherein the integration flow section includes a request subsection in which integration components requesting service, data, or access are placed and a response subsection in which integration components responding to requests are placed.

8. The software development template of claim 1, wherein the integration components include enterprise application integration symbols.

9. The software development template of claim 1, wherein the logging section includes a system logging subsection in which logging components log system events and an application logging subsection in which logging components log messages at an application level.

10. A software development interface implemented on a computing device for use when developing enterprise software architecture designs, the software development interface comprising:

a library of service oriented architecture symbols representing service components;

a library of enterprise application integration symbols representing integration components; and a template comprising a plurality of sections to be displayed on a computing device screen, each section including blank space bounded by a frame with all of the sections being vertically aligned with one another, the sections including:

a technical capabilities section configured to receive a plurality of capability components, each capability component representing a function of a software architecture design, wherein at least a portion of the capability components are positioned in separate columns within the frame, an interaction sequence section configured to receive a plurality of interaction components illustrating the interaction between the capability components, each interaction component being associated with the capability components in one column of the technical capabilities section, each interaction component further being vertically aligned with its associated capability components, a service topology section configured to receive a plurality of service components that represent hardware and software performing functions of the capability components and the interaction components, each service component being associated with the capability components and interaction components in one column, each service component further being vertically aligned with its associated capability components and interaction components, an integration flow section configured to receive a plurality of integration components which represent hardware and software implementing a flow of information between a service requestor and a service provider, each integration component being associated with the capability components, interaction components, and service components in one column, each integration component further being vertically aligned with its associated capability components, interaction components, and service components, and a logging section configured to receive a plurality of logging components which represent hardware and software indicating the occurrence of events or activities related to the function of the software design, each logging component resulting from an action of one or more of the capability components, interaction components, service components, and integration components and being vertically aligned therewith.

11. The software development interface of claim 10, wherein capability components representing similar functions are positioned in the same column.

12. The software development interface of claim 10, wherein the technical capabilities section further includes a plurality of lines, each line connecting at least two capability components to one another, each line including at least one arrowhead indicating a direction of flow of data between the capability components.

13. The software development interface of claim 10, wherein each interaction component includes a vertically-oriented bar and a label positioned therewith describing a specific implementation of the functions of the capability components associated with the interaction component.

14. The software development interface of claim 10, wherein the interaction sequence section further includes a plurality of lines between each pair of adjacently-positioned interaction components, the lines indicating a request, a response, and a time out, as necessary.

15. The software development interface of claim 10, wherein the integration flow section includes a request subsection in which integration components requesting service, data, or access are placed and a response subsection in which integration components responding to requests are placed.

16. The software development interface of claim 10, wherein the logging section includes a system logging subsection in which logging components log system events and an application logging subsection in which logging components log messages at an application level.

17. The software development interface of claim 10, wherein the service components include service oriented architecture symbols.

18. The software development interface of claim 10, wherein the integration components include enterprise application integration symbols.

19. A software development interface implemented on a computing device for use when developing enterprise software architecture designs, the software development interface comprising:
   a library of service oriented architecture symbols representing service components;
   a library of enterprise application integration symbols representing integration components; and
   a template comprising a plurality of sections to be displayed on a computing device screen, each section including blank space bounded by a frame with all of the sections being vertically aligned with one another, the sections including:
      a technical capabilities section configured to receive a plurality of capability components, each capability component representing a function of a software architecture design, wherein at least a portion of the capability components are positioned in separate columns within the frame,
      an interaction sequence section configured to receive a plurality of interaction components illustrating the interaction between the capability components, each interaction component being associated with the capability components in one column of the technical capabilities section, each interaction component further being vertically aligned with its associated capability components,
      a service topology section configured to receive a plurality of service components that represent hardware and software performing functions of the capability components and the interaction components, each service component being associated with the capability components and interaction components in one column, each service component further being vertically aligned with its associated capability components and interaction components, wherein the service components include service oriented architecture symbols,
      an integration flow section configured to receive a plurality of integration components which represent hardware and software implementing a flow of information between a service requestor and a service provider, each integration component being associated with the capability components, interaction components, and service components in one column, each integration component further being vertically aligned with its associated capability components, interaction components, and service components, wherein the integration components include enterprise application integration symbols, and
      a logging section configured to receive a plurality of logging components which represent hardware and software indicating the occurrence of events or activities related to the function of the software design, each logging component resulting from an action of one or more of the capability components, interaction components, service components, and integration components and being vertically aligned therewith.

20. The software development interface of claim 19, wherein
   the technical capabilities section further includes a plurality of lines, each line connecting at least two capability components to one another, each line including at least one arrowhead indicating a direction of flow of data between the capability components,
   each interaction component includes a vertically-oriented bar and a label positioned therewith describing the specific implementation of the function of the capability component associated with the interaction component,
   the interaction sequence section further includes a plurality of lines between each pair of adjacently-positioned interaction components, the lines indicating a request, a response, and a time out, as necessary,
   the integration flow section includes a request subsection in which integration components requesting service, data, or access are placed and a response subsection in which integration components responding to requests are placed, and
   the logging section includes a system logging subsection in which logging components log system events and an application logging subsection in which logging components log messages at an application level.

* * * * *